(12) United States Patent
Eydelman

(10) Patent No.: US 9,307,867 B2
(45) Date of Patent: Apr. 12, 2016

(54) FRUIT SPLITTING DEVICE

(71) Applicant: Boris Eydelman, Morganville, NJ (US)

(72) Inventor: Boris Eydelman, Morganville, NJ (US)

( * ) Notice: Subject to any disclaimer, the term of this patent is extended or adjusted under 35 U.S.C. 154(b) by 104 days.

(21) Appl. No.: 14/340,734

(22) Filed: Jul. 25, 2014

(65) Prior Publication Data

US 2015/0143701 A1 May 28, 2015

Related U.S. Application Data

(60) Provisional application No. 61/909,178, filed on Nov. 26, 2013.

(51) Int. Cl.
*A47J 43/26* (2006.01)
*B25B 7/00* (2006.01)
*B25B 7/18* (2006.01)

(52) U.S. Cl.
CPC . *A47J 43/26* (2013.01); *B25B 7/00* (2013.01); *B25B 7/18* (2013.01)

(58) Field of Classification Search
CPC .............. A47J 43/26; B25B 7/00; B25B 7/18
USPC ..................................... 30/120.3, 0.5; D7/680
See application file for complete search history.

(56) References Cited

U.S. PATENT DOCUMENTS

| | | | | |
|---|---|---|---|---|
| 508,355 A | * | 11/1893 | Streeter | A47J 43/26 30/120.3 |
| 1,129,213 A | | 2/1915 | McEwen | |
| 1,282,278 A | * | 10/1918 | Neuman | A47J 43/26 30/120.4 |
| 1,367,809 A | | 2/1921 | Fons | |
| 1,526,656 A | | 2/1925 | Apple | |
| 1,883,529 A | * | 10/1932 | Buckwalter | A47J 43/26 30/120.2 |
| 2,379,121 A | * | 6/1945 | Via | A47J 43/26 30/120.3 |
| 2,521,552 A | | 9/1950 | Thompson | |
| 2,550,197 A | * | 4/1951 | Lisbon | A47J 43/26 30/120.3 |
| 2,861,339 A | * | 11/1958 | Malecki | B26B 21/10 30/112 |
| 3,148,718 A | * | 9/1964 | Plott | A47J 43/26 30/120.3 |
| 3,280,867 A | * | 10/1966 | Bracco | A47J 43/26 30/120.2 |
| 3,784,020 A | * | 1/1974 | Steiner | D06F 57/12 182/195 |
| 3,796,169 A | * | 3/1974 | Bales | A47B 3/0815 108/116 |
| 4,171,567 A | * | 10/1979 | Papalardo | A47J 43/26 30/120.4 |
| 4,198,747 A | * | 4/1980 | LaBounty | E02F 3/965 30/134 |
| 4,519,135 A | * | 5/1985 | LaBounty | B23D 17/00 144/34.5 |
| 4,771,540 A | * | 9/1988 | LaBounty | E02F 3/965 144/345 |
| D304,891 S | * | 12/1989 | Borromeo | B26B 17/00 D7/680 |
| 4,908,946 A | * | 3/1990 | Labounty | A01G 23/087 144/339 |

(Continued)

FOREIGN PATENT DOCUMENTS

GB 271700 6/1927

*Primary Examiner* — Sean Michalski

(57) ABSTRACT

A fruit splitting device facilitates the process of splitting open a fruit, such as a coconut shell. The device includes a hoop having a first jaw and a second jaw pivotally coupled together for pivoting the hoop between an open position and a closed position. A first handle has a first end coupled to the hoop. A second handle has a first end being coupled to the hoop. A plurality of first teeth is coupled to an inner surface of the first jaw. The first teeth are spaced from each other. A plurality of second teeth is coupled to an interior surface of the second jaw. The second teeth are spaced from each other. The second teeth are positioned opposite the first teeth wherein the first and second teeth engage and split open a fruit when the first and second teeth exert pressure on the fruit.

7 Claims, 5 Drawing Sheets

(56) References Cited

U.S. PATENT DOCUMENTS

| | | | | |
|---|---|---|---|---|
| 4,964,216 A * | 10/1990 | Gosselin | ............... | B26B 13/00 30/194 |
| 5,267,698 A | 12/1993 | Pettit | | |
| D346,097 S * | 4/1994 | Godinger | ............... | B26B 17/00 D7/680 |
| D358,305 S * | 5/1995 | Winter | ............... | B26B 17/00 D7/680 |
| 5,531,007 A * | 7/1996 | Labounty | ............... | B23D 17/00 241/101.73 |
| 5,566,452 A * | 10/1996 | Sample | ............... | A47J 43/26 30/120.2 |
| 5,596,807 A * | 1/1997 | Carr | ............... | A47G 21/061 30/120.3 |
| D415,659 S * | 10/1999 | Weibel | ............... | B26B 17/00 D7/680 |
| 5,988,027 A * | 11/1999 | Lenox | ............... | A61B 17/8863 83/13 |
| 6,052,906 A * | 4/2000 | Weibel | ............... | A47J 43/26 30/120.2 |
| 6,151,782 A * | 11/2000 | Le Bail | ............... | A47J 43/26 30/120.1 |
| D436,300 S * | 1/2001 | Chiu | ............... | A47J 43/26 D7/680 |
| D454,036 S * | 3/2002 | Tse | ............... | A47J 43/26 D7/680 |
| D461,377 S * | 8/2002 | Law | ............... | A47J 43/26 D7/680 |
| D469,668 S * | 2/2003 | Prommel | ............... | A47J 43/26 D7/680 |
| D480,278 S * | 10/2003 | Jones | ............... | A47J 43/26 D7/680 |
| D492,164 S * | 6/2004 | Robinson | ............... | A47J 43/26 D7/680 |
| D494,820 S * | 8/2004 | Powell | ............... | A47J 43/26 D7/680 |
| 6,785,967 B1 * | 9/2004 | Allievi | ............... | A47G 21/065 30/120.1 |
| D509,412 S * | 9/2005 | Lee | ............... | A47J 43/26 D7/680 |
| 6,983,506 B1 * | 1/2006 | Brown | ............... | B25F 1/003 7/118 |
| 7,261,627 B2 * | 8/2007 | Sellars, Jr. | ............... | A22C 29/024 452/103 |
| D579,280 S * | 10/2008 | Bodum | ............... | B26B 13/00 D7/680 |
| 7,806,028 B2 * | 10/2010 | Yue | ............... | A47J 43/26 30/120.1 |
| 7,938,153 B1 * | 5/2011 | Gregory, Jr. | ............... | A01G 23/08 144/24.13 |
| 7,959,967 B2 | 6/2011 | Pattenden | | |
| 2003/0164185 A1 * | 9/2003 | Price | ............... | E04H 15/50 135/131 |
| 2004/0211066 A1 * | 10/2004 | Horng | ............... | A47J 43/26 30/120.3 |
| 2005/0184547 A1 * | 8/2005 | Rasmussen | ............... | B60P 3/34 296/26.01 |
| 2006/0011022 A1 * | 1/2006 | Fairburn | ............... | B25B 7/00 81/300 |
| 2006/0150786 A1 * | 7/2006 | Whitehead | ............... | B35B 7/00 81/300 |
| 2006/0288552 A1 * | 12/2006 | Roll | ............... | A61M 39/12 29/237 |
| 2007/0079512 A1 * | 4/2007 | Nelson | ............... | B25C 1/04 30/123.3 |
| 2007/0161470 A1 * | 7/2007 | Berryman | ............... | A63B 21/00072 482/94 |
| 2007/0262597 A1 * | 11/2007 | Ramos | ............... | B25B 7/00 294/210 |
| 2008/0250569 A1 * | 10/2008 | Higgins | ............... | A01K 91/04 7/129 |
| 2009/0139094 A1 | 6/2009 | Beloin | | |
| 2010/0124595 A1 * | 5/2010 | Pattenden | ............... | B26D 3/26 426/518 |
| 2011/0000090 A1 * | 1/2011 | Pau | ............... | A47J 43/26 30/120.2 |
| 2011/0283545 A1 * | 11/2011 | Wu | ............... | A01G 3/02 30/250 |
| 2012/0104710 A1 * | 5/2012 | Liu | ............... | A61H 3/04 280/42 |
| 2014/0216311 A1 * | 8/2014 | De Lany | ............... | A01C 23/026 111/118 |
| 2014/0298661 A1 * | 10/2014 | Carmichael | ............... | B26B 13/26 30/252 |
| 2014/0331825 A1 * | 11/2014 | Khristyuchenko | ............... | B25B 7/18 81/393 |
| 2015/0059537 A1 * | 3/2015 | Chen | ............... | B25B 7/04 81/319 |
| 2015/0113852 A1 * | 4/2015 | Kudner | ............... | A01K 77/00 43/11 |
| 2015/0158151 A1 * | 6/2015 | Brown | ............... | B25B 7/14 81/365 |
| 2015/0202766 A1 * | 7/2015 | Light | ............... | B25G 1/04 16/429 |
| 2015/0342246 A1 * | 12/2015 | Ingles | ............... | A23N 5/03 83/464 |

* cited by examiner

_US 9,307,867 B2_

1

FRUIT SPLITTING DEVICE

BACKGROUND OF THE DISCLOSURE

Field of the Disclosure

The disclosure relates to fruit opening devices and more particularly pertains to a new fruit opening device for facilitating the process of splitting open a fruit, such as a coconut shell.

SUMMARY OF THE DISCLOSURE

An embodiment of the disclosure meets the needs presented above by generally comprising a hoop having a first jaw and a second jaw pivotally coupled together for pivoting the hoop between an open position and a closed position. A first handle has a first end coupled to the hoop. A second handle has a first end being coupled to the hoop. A plurality of first teeth is coupled to an inner surface of the first jaw. The first teeth are spaced from each other. A plurality of second teeth is coupled to an interior surface of the second jaw. The second teeth are spaced from each other. The second teeth are positioned opposite the first teeth wherein the first and second teeth engage and split open a fruit when the first and second teeth exert pressure on the fruit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
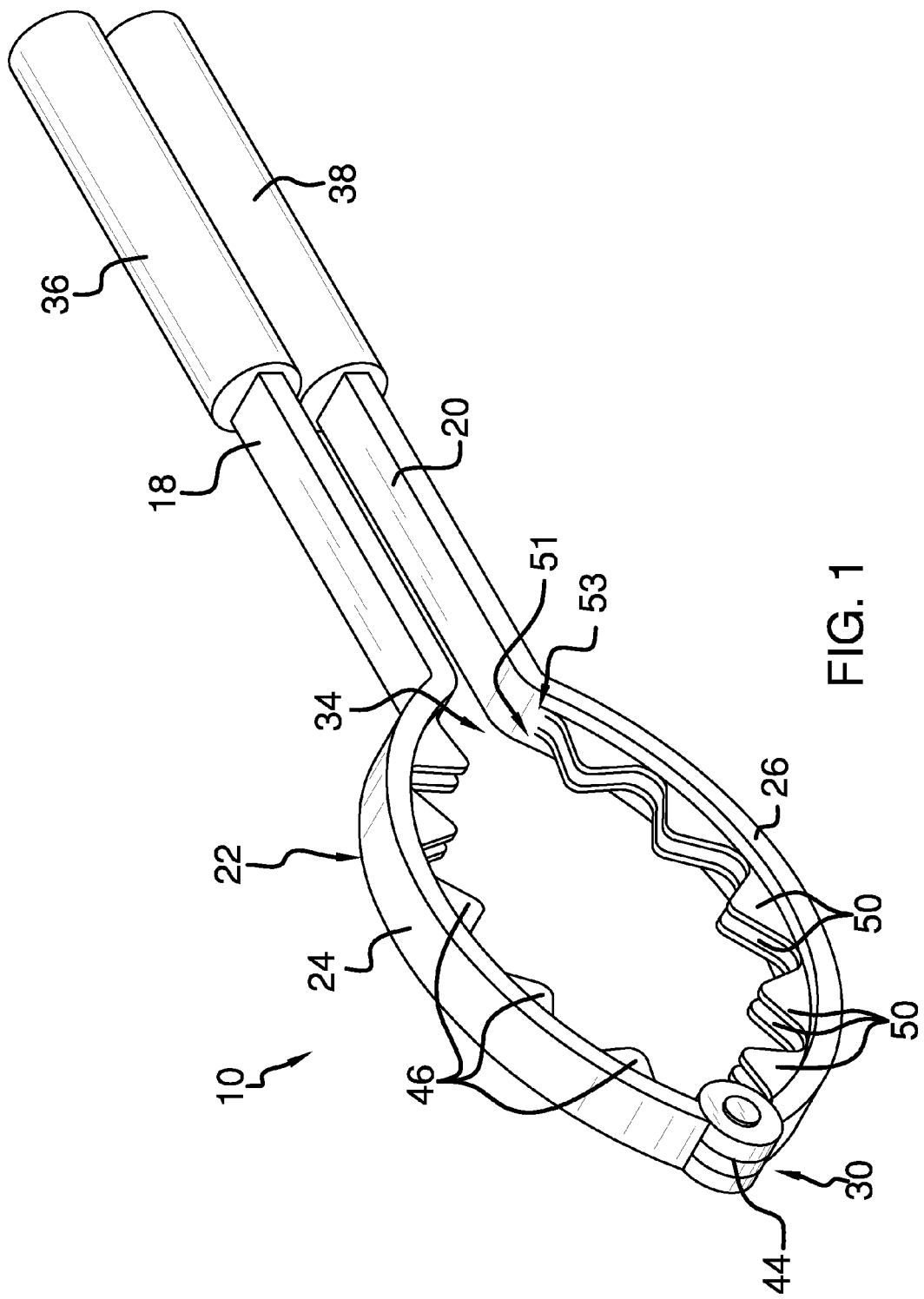
FIG. 1 is a top front side perspective view of a fruit splitting device according to an embodiment of the disclosure.
Figure 2:
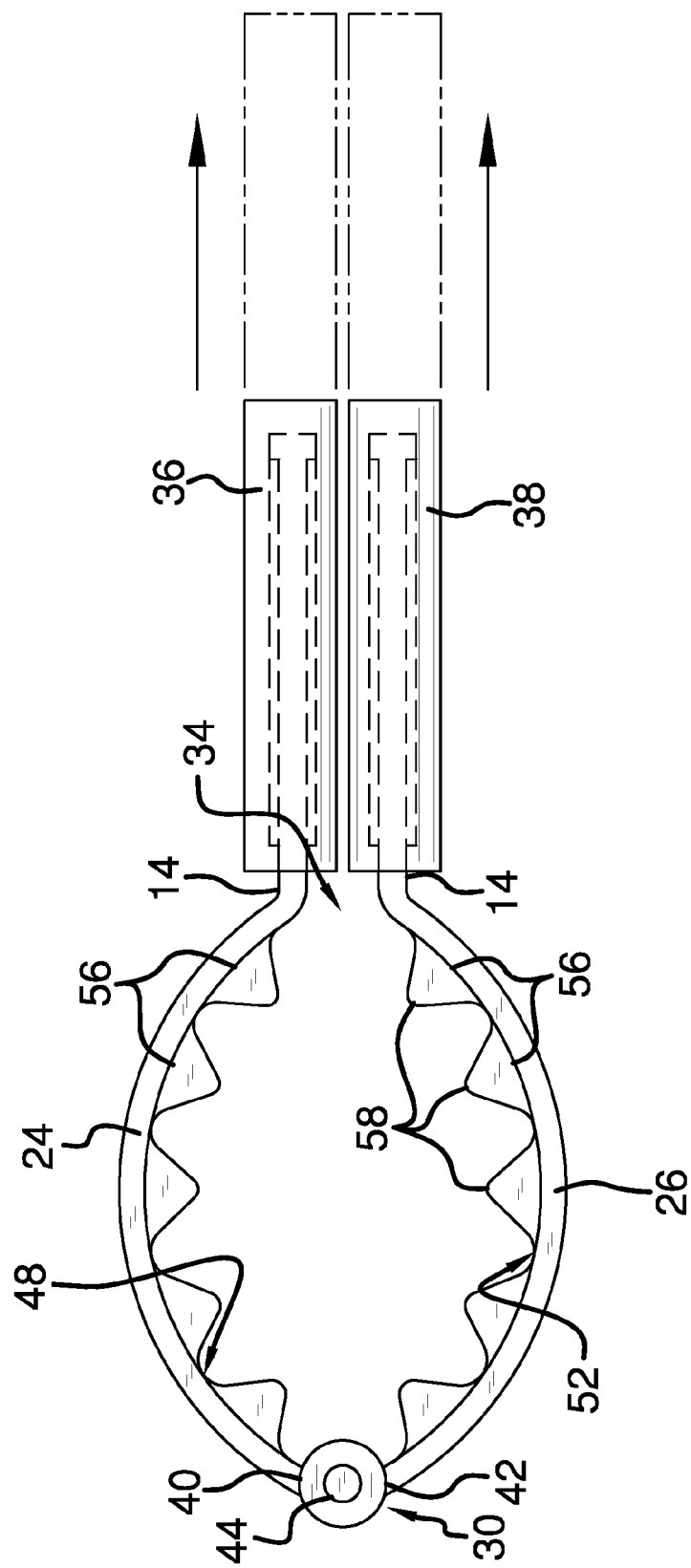
FIG. 2 is a front view of an embodiment of the disclosure.
Figure 3:
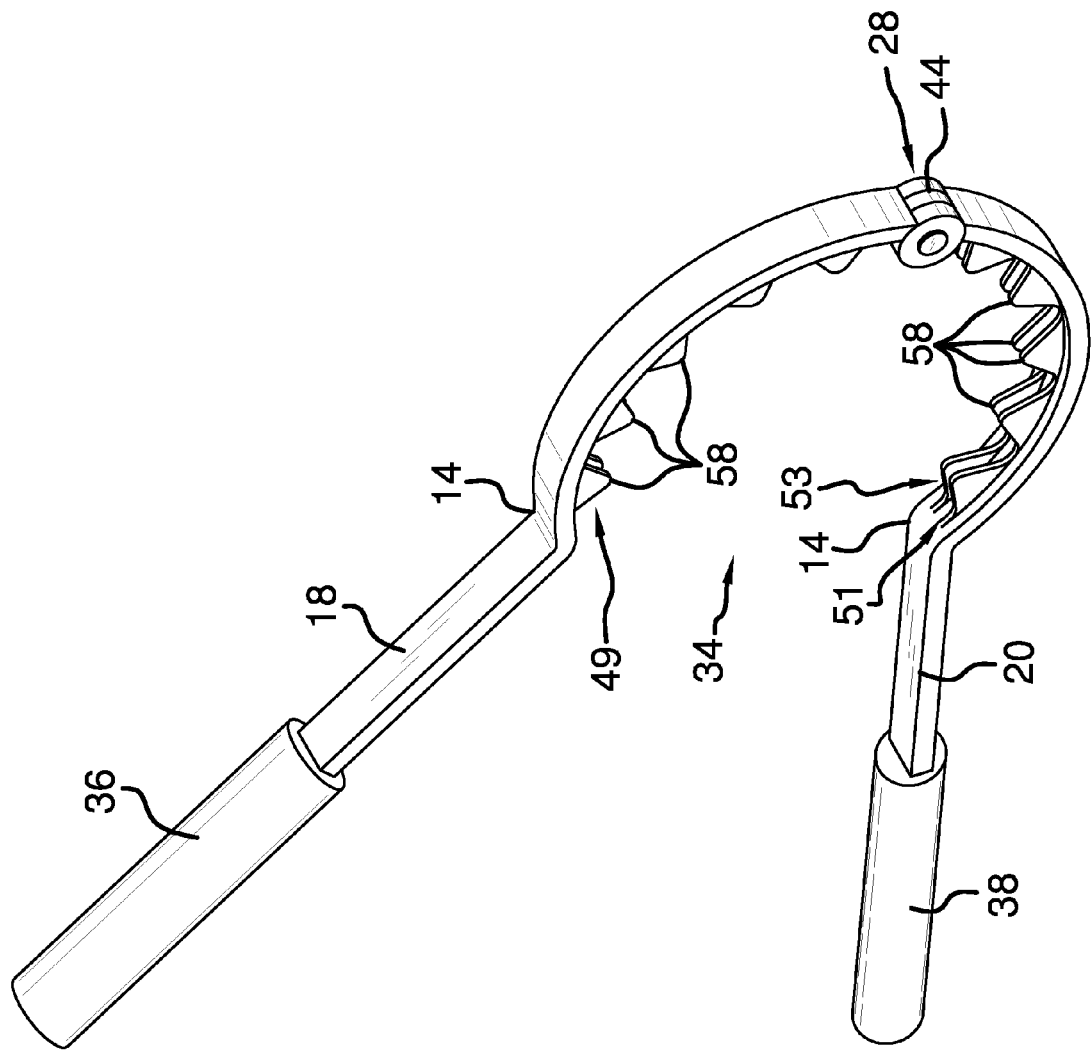
FIG. 3 is a top front side perspective view of an embodiment of the disclosure showing the first and second jaws in an open position.
Figure 4:
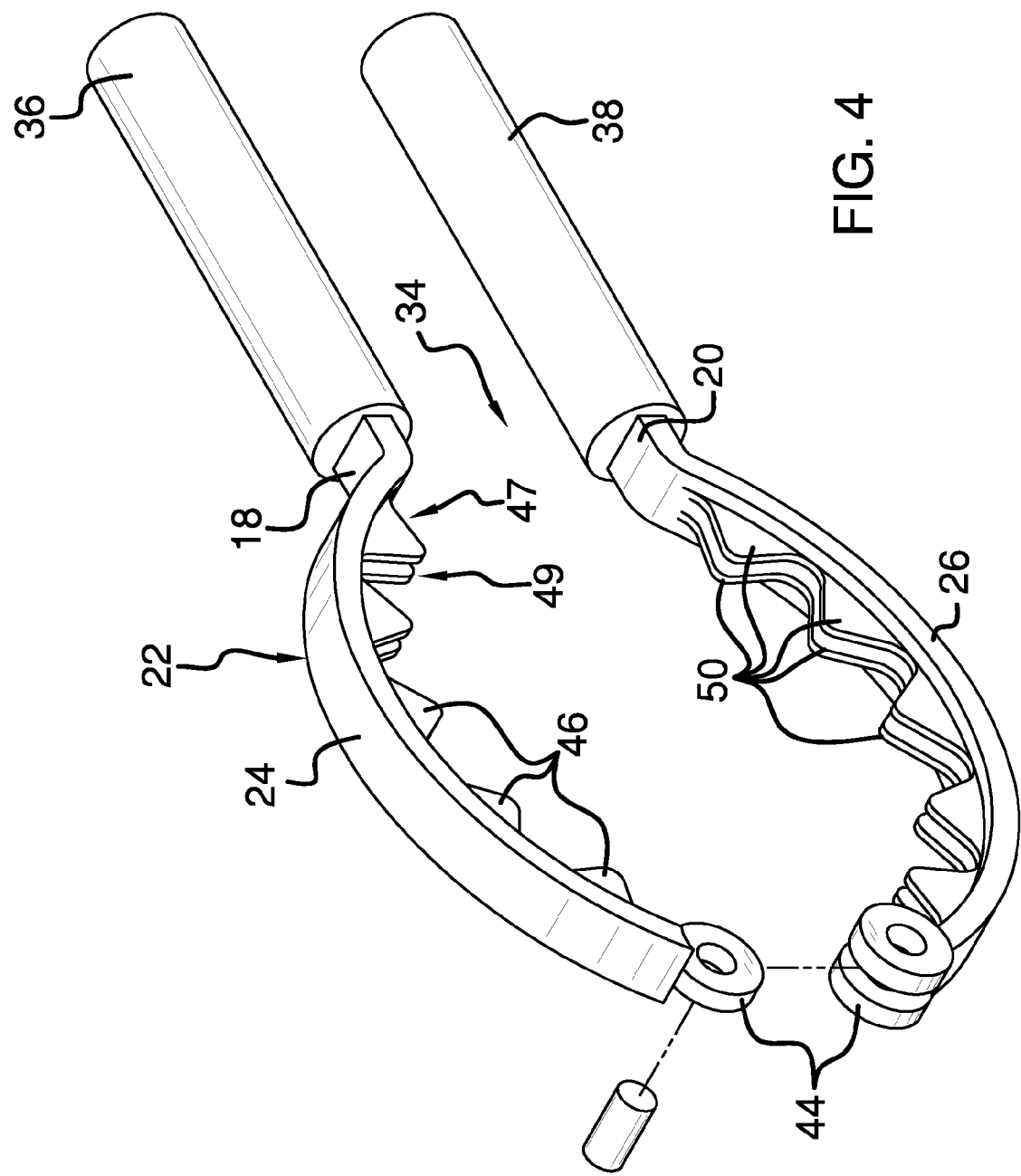
FIG. 4 is a perspective exploded view of an embodiment of the disclosure.
Figure 5:
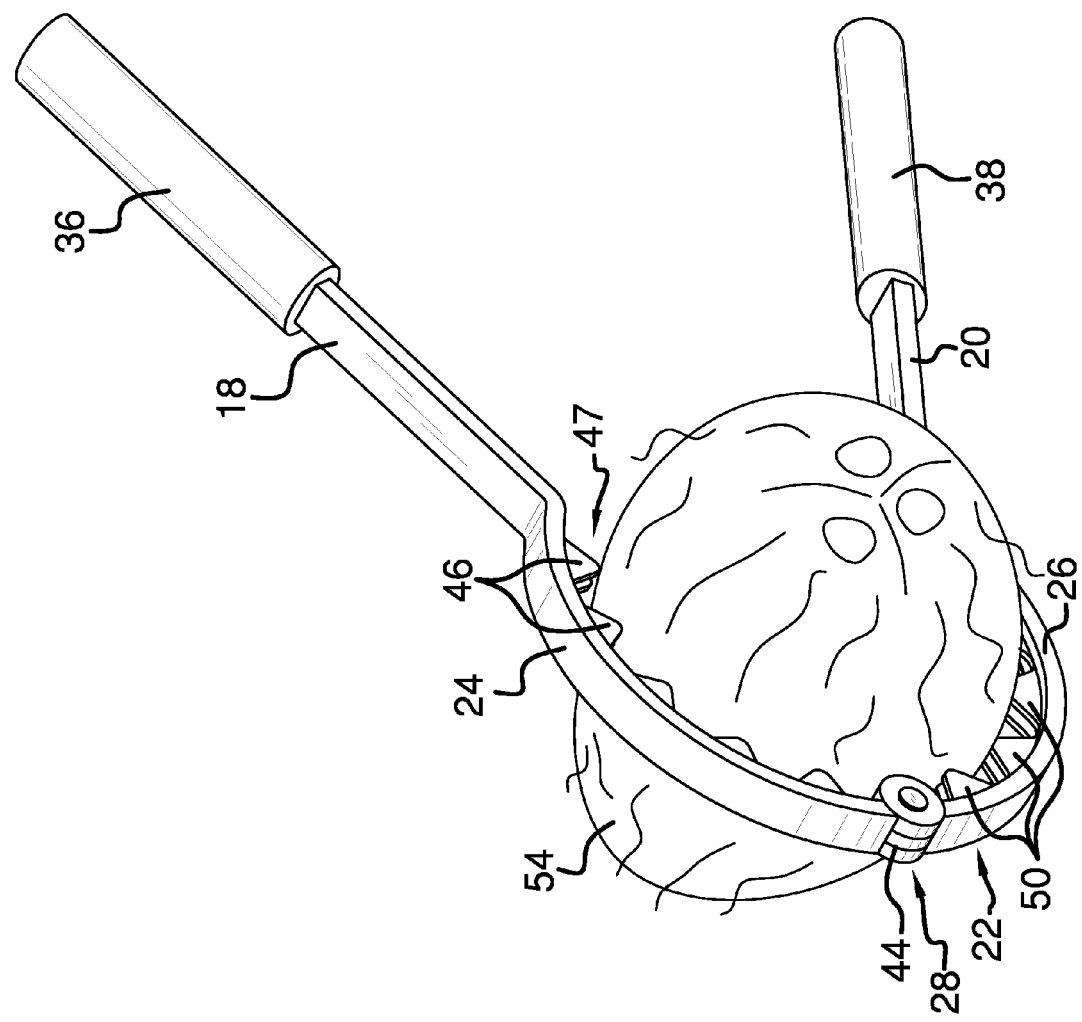
FIG. 5 is an in-use view of an embodiment of the disclosure.

With reference now to the drawings, and in particular to FIGS. 1 through 5 thereof, a new fruit opening device embodying the principles and concepts of an embodiment of the disclosure and generally designated by the reference numeral 10 will be described.

As best illustrated in FIGS. 1 through 5, the fruit splitting device 10 generally comprises a first handle 18 and a second handle 20. The first 18 and second 20 handles may each be telescopic in a generally conventional manner to permit adjustment of a length of the associated first 18 and second 20 handles. Each of the first 18 and second 20 handles may include a respective grip 36, 38. The grips 36, 38 of the first 18 and second 20 handles abut each other when the hoop 22 is in the closed position 30. More particularly, the grips 36, 38 may each comprise a slidable sleeve to permit telescoping of the first 18 and second 20 handles.

A hoop 22 is coupled to a respective first end 14 of each of the associated first 18 and second 20 handles. More particularly, the hoop 22 and the first 18 and second 20 handles are integrally coupled together. The hoop 22 has an oval shape and is elongated along a line extending through the first handle 18 and a line extending through the second handle 20. The first 18 and second 20 handles lie in a plane of the hoop 22.

The hoop 22 has a first jaw 24 and a second jaw 26 pivotally coupled together for pivoting the hoop 22 between an open position 28 and a closed position 30. The first handle 18 is coupled to the first jaw 24. The second handle 20 is coupled to the second jaw 26. The hoop 22 has a break 34 therein positioned proximate the first end 14 of each of the associated first 18 and second 20 handles to permit moving the first 18 and second 20 handles towards and away from each other when moving the first 24 and second 26 jaws between the open 28 and closed 30 positions.

The first jaw 24 has a distal end 40 relative to the first end 14 of the first handle 18. Similarly, the second jaw 26 has a far end 42 relative to the first end 14 of the second handle 20. A hinge 44 is coupled to the first jaw 24 and the second jaw 26 at a juncture between the first 24 and second 26 jaws. More particularly, the hinge 44 is pivotally coupled to each of the distal end 40 and the far end 42.

A plurality of first teeth 46 is coupled to an inner surface 48 of the first jaw 24. The first teeth 46 are spaced apart from each other. The first teeth 46 include at least a first row 47 and a second row 49 each extending along a longitudinal axis of the first jaw 24. The first row 47 and the second row 49 are spaced and aligned with respect to each other. A plurality of second teeth 50 is coupled to an interior surface 52 of the second jaw 26. The second teeth 50 are also spaced apart from each other. The second teeth 50 are positioned opposite the first teeth 46 wherein the first 46 and second 50 teeth are configured to engage and split open a shell of a fruit 54, such as a coconut, when the first 46 and second 50 teeth exert pressure on the fruit 54. The second teeth 50 include at least a primary row 51 and a secondary row 53 each extending along a longitudinal axis of the second jaw 26. The primary row 51 and the secondary row 53 are spaced and aligned with respect to each other. Each of the first 46 and second 50 teeth has a base 56 and an apex 58 positioned opposite the base 56. The apex 58 of each of the first 46 and second 50 teeth may be curved. The telescopic nature of the handle 12, which was described above, is configured to provide additional leverage to facilitate splitting of the fruit 54, while also permitting compact storage of the device 10 as needed.

In use, the hoop 22 is moved to the open position 28. A fruit 54, such as a coconut, is placed between the first 24 and second 26 jaws such that the first 46 and second 50 teeth engage a shell of the fruit 54. The first 18 and second 20 handles are then squeezed together in order to crack the shell of the fruit 54. The first 18 and second 20 handles can be extended to provide additional leverage to facilitate splitting of the fruit 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fruit splitting device sized and configured to split open coconuts comprising:
    a splitting end having a first curved jaw and a second curved jaw pivotally coupled together for pivoting said first jaw and said second jaw between an open position and a closed splitting position;
    a first handle having a first portion integrally formed with said first jaw, the first handle first portion having a polygonal cross section, and the first handle first portion extending in a straight line away from said first curved jaw and defining a first handle axis;
    said first handle further having a second portion including a slot with a polygonal cross section similar to said first handle first portion polygonal cross section for telescopically engaging the first portion, and configured to slide along said first handle axis between a retracted position adjacent said first jaw and an extended position distal to said first jaw;
    a second handle having a first portion integrally formed with said second jaw, the second handle first portion having a polygonal cross section, and the second handle first portion extending in a straight line and defining a second handle axis;
    said second handle further having a second portion including a slot with a polygonal cross section similar to said second handle first portion telescopically connected to the first end, and configured to move along said first handle axis between a retracted position adjacent said first jaw and an extended position distal to said first jaw;
    at least two rows of first teeth coupled to an inner surface of said first jaw; each row extending parallel to said first handle axis and being spaced from an adjacent row in a width direction perpendicular to said first handle axis; and
    at least two rows of second teeth coupled to an interior surface of said second jaw; each row extending parallel to said first handle axis and being spaced from an adjacent row in a width direction perpendicular to said first handle axis, said first teeth and second teeth are configured to engage and split open a fruit when said first teeth and second teeth exert pressure on the fruit.

2. The device of claim 1, further comprising a hinge coupled to said first jaw and said second jaw at a juncture between said first and second jaw.

3. The device of claim 2, further comprising said first jaw having a distal end relative to said first end of said first handle, said second jaw having a far end relative to said first end of said second handle, said hinge being pivotally coupled to each of said first distal end and said second distal end.

4. The device of claim 1, further comprising said first and second jaws in said closed position forms an oval shape and being elongated along a line extending through said first handle and a line extending through said second handle, each of said first and second handles lying in a plane.

5. The device of claim 1, further comprising each of said first and second handle second portions includes a respective grip, said grips of said first and second handle second portions abuts each other when said first and second jaws are in the closed position.

6. The device of claim 1, further comprising each of said first and second teeth having a base and an apex positioned opposite said base, said apex of each of said first and second teeth being curved.

7. A fruit splitting device sized and configured to split open coconuts comprising:
    a splitting end having a first curved jaw and a second curved jaw pivotally coupled together for pivoting said jaws between an open position and a closed splitting position;
    a first handle having a first portion coupled to said first jaw, said first jaw having a distal end relative to said first end of said first handle and the first handle first portion having a polygonal cross section, and the first handle first portion extending in a straight line away from said first curved jaw and defining a first handle axis;
    said first handle further having a second portion including a slot with a polygonal cross section similar to said first handle first portion polygonal cross section for telescopically engaging the first portion, and configured to slide along said first handle axis between a retracted position adjacent said first jaw and an extended position distal to said first jaw;
    a second handle coupled to said second curved jaw, said second handle having a first portion being coupled to said second jaw, said second jaw having a far end relative to said first end of said second handle, the second handle first portion having a polygonal cross section, and the second handle first portion extending in a straight line and defining a second handle axis;
    said second handle further having a second portion including a slot with a polygonal cross section similar to said second handle first portion telescopically connected to the first end, and configured to move along said first handle axis between a retracted position adjacent said first jaw and an extended position distal to said first jaw;
    said first and second jaws being integrally coupled together with respective first handle first portions and second handle first portions;
    said first and second jaws in said closed position form an oval shape and are elongated along said first handle axis and said second handle axis, each of said first and second handles lying in a plane with said jaws;
    each of said first and second handles including a respective grip, said grips of said first and second handles abutting each other when said jaws are in the closed position;
    a hinge coupled to said first jaw and said second jaw at a juncture between said first and second jaw, said hinge being pivotally coupled to each of said distal end and said far end;
    two rows of first teeth coupled to an inner surface of said first jaw, said first teeth including a first row and a second row each extending along a longitudinal axis of said first jaw; each row extending parallel to said first handle axis and being spaced from an adjacent row in a width direction perpendicular to said first handle axis;

two rows of second teeth coupled to an interior surface of said second jaw; said two rows of second teeth including a first row and a second row each extending along a longitudinal axis of said first jaw; each row extending parallel to said first handle axis and being spaced from an adjacent row in a width direction perpendicular to said first handle axis, wherein said first and second teeth are configured to engage and split open a fruit when said first and second teeth exert pressure on the coconut, said second teeth including a primary row and a secondary row each extending along a longitudinal axis of said second jaw, said primary row and said secondary row being spaced and aligned with respect to each other, each of said first and second teeth having a base and an apex positioned opposite said base, said apex of each of said first and second teeth being curved; and each of said first and second handles configured to provide leverage to facilitate splitting of the coconut.

\* \* \* \* \*